United States Patent [19]

Buxbaum et al.

[11] 4,163,099

[45] Jul. 31, 1979

[54] POLYESTERS PREPARED FROM NH CONTAINING CARBOXYLIC ACIDS

[75] Inventors: Lothar Buxbaum, Lindenfels, Fed. Rep. of Germany; Jürgen Habermeier, Pfeffingen; Hans Batzer, Arlesheim, both of Switzerland

[73] Assignee: Ciba-Geigy Corporation, Ardsley, N.Y.

[21] Appl. No.: 889,155

[22] Filed: Mar. 22, 1978

Related U.S. Application Data

[63] Continuation-in-part of Ser. No. 836,941, Sep. 27, 1977, abandoned.

[51] Int. Cl.² ............................................. C08G 69/44
[52] U.S. Cl. ..................................... 528/172; 528/184; 528/191; 528/194; 528/195
[58] Field of Search .............. 260/47 C, 47 CB, 75 N; 528/172, 184, 191, 194, 195

[56] References Cited

U.S. PATENT DOCUMENTS

| | | | |
|---|---|---|---|
| 3,393,180 | 7/1968 | Thoma et al. | 260/78 |
| 3,717,614 | 2/1973 | Lyssy et al. | 260/77.5 |
| 3,772,250 | 11/1973 | Economy et al. | 260/47 CP |
| 3,920,611 | 11/1978 | Rio et al. | 260/47 CP |

*Primary Examiner*—Lester L. Lee
*Attorney, Agent, or Firm*—Luther A. R. Hall

[57] ABSTRACT

Linear thermoplastic polyesters obtained from (a) dicarboxylic acids which contain NH groups, (b) if desired, terephthalic acid and/or isophthalic acid, (c) if desired, diols containing aliphatic diol groups and (d) β-hydroxyalkylated bisphenols are materials from which it is possible to produce shaped articles which have good properties, for example good resistance to stress cracking and stability to thermooxidative degradation, and also a low absorption of water.

22 Claims, No Drawings

POLYESTERS PREPARED FROM NH CONTAINING CARBOXYLIC ACIDS

This application is a continuation in part of application Ser. No. 836,941, filed Sept. 27, 1977 and now abandoned.

The present invention relates to polyesters obtained from dicarboxylic acids which contain NH groups, if desired terephthalic acid and/or isophthalic acid, a β-hydroxyalkylated bisphenol and, if desired, further diols containing aliphatic diol groups.

Polyesters and copolyesters with s-triazinedicarboxylic acids are described in German Offenlegungsschriften Nos. 2,533,675 and 2,533,715. Copolyesters which contain dicarboxylic acid diamides are described in German Offenlegungsschrift No. 2,414,349. These polyesters which contain NH groups have the disadvantage that their stability to thermooxidative degradation is relatively low and that they possess a relatively high capacity for water absorption. Because of their low resistance to stress cracking, their field of application is limited.

The object of the present invention is to provide polyesters which contain NH groups (polyesteramides), which show a lower absorption of water and have improved stability to thermooxidative degradation and resistance to stress cracking, without this resulting in a deterioration of the mechanical properties.

The present invention relates to linear thermoplastic polyesters which have a relative viscosity of at least 1.30, measured on a solution of 1 g of polyester in 100 ml of a solvent consisting of equal parts of phenol and symmetrical tetrachloroethane at 30° C., and consist, relative to the polyester, of (a) 25–50 mol % of at least one dicarboxylic acid which contains NH groups and is of the general formula I

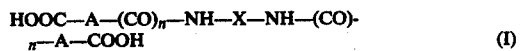

in which A represents o-, m- or p-phenylene and 1,4- or 1,6-naphthylene and, when n=0, X represents a radical of the formula II

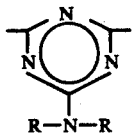

in which R represents methyl, ethyl, cyclohexyl or phenyl, or, when n=1, X represents a divalent hydrocarbon radical of aliphatic or aromatic character, (b) 25–0 mol % of terephthalic acid and/or isophthalic acid and (c) 0 to 25 mol % of one or more diols containing aliphatic diol groups, wherein (d) 50–25 mol % of at least one bisphenol derivative of the general formula III

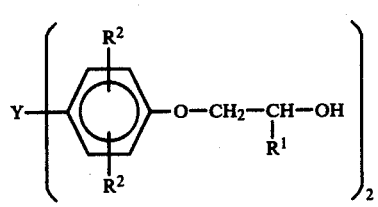

in which $R^1$ represents a hydrogen atom, methyl or ethyl, $R^2$ represents a hydrogen, chlorine or bromine atom or methyl and Y represents substituted or unsubstituted alkylene, alkylidene or cycloalkylidene, a direct bond, O, S or $SO_2$, have been co-condensed as a diol containing aliphatic diol groups.

Preferably, the relative viscosity of the polyesters is 1.5–3.5.

Preferably, the polyester consists to the extent of 40–50 mol %, and especially 50 mol %, of the dicarboxylic acids (a), to the extent of 10–0 mol % of the dicarboxylic acids (b), to the extent of 10–0 mol % of the diols (c) and to the extent of 40–50 mol %, and especially 50 mol %, of the diols (d).

In formula I, A preferably represents m-phenylene and especially p-phenylene.

The triazinedicarboxylic acids of the formula I, in which R in formula II preferably represents ethyl and phenyl, are described in German Offenlegungsschrift No. 2,121,184.

The dicarboxylic acid diamides of the formula I are known from German Offenlegungsschrift No. 2,414,349. In these compounds, X, as a divalent hydrocarbon radical, preferably represents linear or branched alkylene having, especially, 2 to 6 C atoms and especially represents substituted or unsubstituted cycloalkylene, alkylcycloalkylene, alkylcycloalkylenealkyl, arylene, alkylarylene or alkylarylenealkyl, which preferably contain a total of 5 to 15 C atoms. Cycloalkylene preferably contains 5 to 7 ring members and arylene is preferably phenylene. The alkylene groups in the cyclic radicals contain preferably 1 to 4 and especially 1 to 2 C atoms and in particular 1 C atom.

Examples of X as alkylene are methylene, ethylene, 1,2- and 1,3-propylene, 1,2-, 1,3- and 1,4-butylene, pentylene, hexylene and dodecylene.

Examples of divalent aromatic hydrocarbon radicals are: p- and m-phenylene, p- and m-tolylene, p- and m-xylylene, 1-methylenephenyl and 1,3- or 1,4-bis-methylene-benzene.

Examples of suitable cycloaliphatic and cycloaliphatic-aliphatic divalent radicals are: 3-methylene-3,5,5-trimethyl-1-cyclohexyl (isophorone); bis-(3-methylcyclohexylene-4)-methane, 2,2-bis-(p-cyclohexylene)-propane, bis-(p-cyclohexylene)-methane, 1,8-menthylene, 2-methylene-cyclopentyl, 1,3-cyclohexylene, 1,4-cyclohexylene, 2-methyl-1,3-cyclohexylene, 2-methyl-1,4-cyclohexylene, 1,3-cyclopentylene, 1,3-cycloheptylene, 1,4-cycloheptylene, 1-methylenecyclohexyl and 1,4-bis-methylenecyclohexane.

X in formula I is preferably phenylene, cyclohexylene or a radical of the formulae

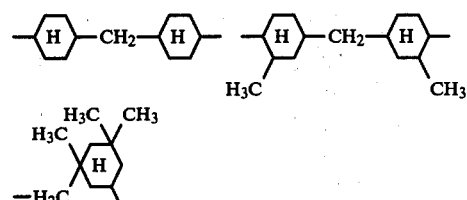

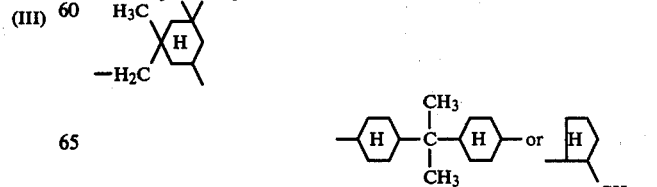

The polyesters can also contain diols (c) having aliphatic diol groups.

Examples of such diols are linear or branched alkylene-diols having preferably 2 to 12 and especially 2 to 6 C atoms. The alkylenediol is especially ethylene glycol or tetramethylene glycol. 1,4-Cyclohexanediol and 1,4-di-hydroxymethyl-cyclohexane may also be mentioned.

A further group of diols (c) having aliphatic diol groups are those of the general formula IV

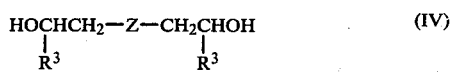

in which $R^3$ represents methyl or preferably represents a hydrogen atom and Z represents a radical of the formulae V-Vc

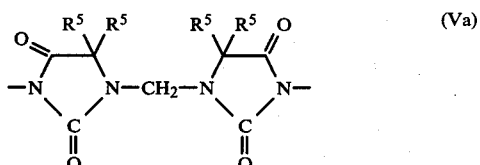

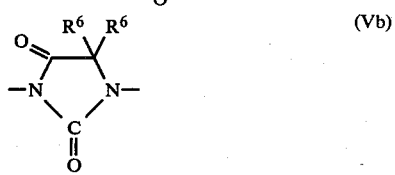

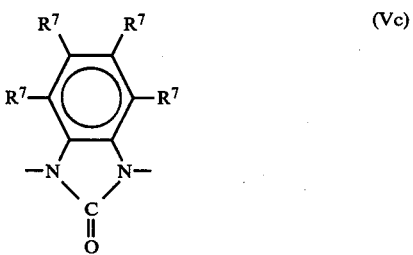

in which $R^4$, $R^5$ and $R^6$ independently of one another represent alkyl having 1 to 4 C atoms or together represent tetra- or penta-methylene and the $R^7$ independently of one another represent a hydrogen, chlorine or bromine atom.

The diols of the formula IV are known and are described, for example, in German Offenlegungsschriften Nos. 1,812,003, 2,342,432, 2,342,372 and 2,453,326. Examples are: N,N'-bis-(β-hydroxyethyl-5,5-dimethyl)-hydantoin, N,N'-bis-(β-hydroxypropyl-5,5-dimethyl)-hydantoin, methylene-bis-[N,N'-(β-hydroxyethyl)-5-methyl-5-ethylenehydantoin], methylene-bis-[N-(β-hydroxyethyl)-5,5-dimethylhydantoin], N,N'-bis-(β-hydroxyethyl)-benzimidazolone, -(tetrachloro)-benzimidazolone or -(tetrabromo)-benzimidazolone.

Preferably, in formula IV, $R^3$ represents a hydrogen atom, $R^4$, $R^5$ and $R^6$ represent methyl and all the $R^7$ represent either a hydrogen atom, a chlorine atom or a bromine atom.

In the diols (d), $R^1$ in formula III preferably represents methyl and especially represents a hydrogen atom. $R^2$ is, furthermore, preferably bonded in the two ortho-positions relative to the oxygen atom. In particular, $R^2$ represents a hydrogen atom.

Examples of substituted or unsubstituted alkylene are: methylene, ethylene, phenylmethylene, diphenylmethylene and methylphenylmethylene.

Examples of substituted or unsubstituted alkylidene are: ethylidene, 1,4- or 1,2-propylidene, butylidene, 1,1-dichloroethylidene or 1,1,1-trichloroethylidene.

Examples of cycloalkylidene are: cyclopentylidene, cyclohexylidene, cycloheptylidene and cyclooctylidene.

The diols of the formula II are obtained by reacting corresponding bisphenols with ethylene oxide, propylene oxide or butylene oxide.

Examples of bisphenols are: bis-(p-hydroxyphenyl)-ether or thioether, bis-(p-hydroxyphenyl)-sulphone, bis-(p-hydroxyphenyl)-methane, 1,2-bis-(p-hydroxyphenyl)-ethane, phenyl-bis-(p-hydroxyphenyl)-methane, diphenyl-bis-(p-hydroxyphenyl)-methane, 2,2-bis-(4'-hydroxy-3'-methylphenyl)-propane, 2,2-bis-(4'-hydroxy-3',5'-dimethylphenyl)-propane, 2,2-bis-(4'-hydroxy-3'-chlorophenyl)-propane, 2,2-bis-(4'-hydroxy-3',5'-dichlorophenyl)-propane, 2,2-bis-(4'-hydroxy-3',5'-dibromophenyl)-propane, 1,1- or 2,2-bis-(p-hydroxyphenyl)-butane, 1,1-dichloro- or 1,1,1-trichloro-2,2-bis-(p-hydroxyphenyl)-ethane and 1,1-bis-(p-hydroxyphenyl)-cyclopentane and especially 2,2-bis-(p-hydroxyphenyl)-propane (bisphenol A) and 1,1-bis-(p-hydroxyphenyl)-cyclohexane (bisphenol C).

A particularly preferred diol from this group is 2,2-bis-[4'-(β-hydroxyethyl)-phenyl]-propane.

The polyesters according to the invention are obtained according to known processes by subjecting the dicarboxylic acids, or thereof polyester-forming derivatives to a polycondensation reaction with one or more diols containing aliphatic alcohol groups at temperatures of 50° to 320° C., under normal pressure, in vacuo and/or in a stream of inert gas, until the desired viscosity is reached.

The known processes for the preparation of the novel polyesters are, for example, solution condensation or azeotropic condensation, interfacial condensation, melt condensation or solid phase condensation as well as combinations of these methods, depending on which polyester-forming derivatives and reaction catalysts are used. Solid phase condensation can also be carried out in thin layers, if necessary with the aid of a solid parting agent, for example micromica, talc, titanium dioxide or glass balls.

Polyester-forming derivatives of the dicarboxylic acids which are used are, in the main, the low-molecular dialkyl esters having 1 to 4 carbon atoms in the molecule, preferably the dimethyl esters or diphenyl esters. Furthermore, the acid dihalides, especially the acid dichlorides, and the mixed anhydrides obtained from the dicarboxylic acids and low-molecular aliphatic monocarboxylic acids are also suitable.

In one embodiment, the polyesters according to the invention can be prepared by esterifying or transesterifying the dicarboxylic acid, or several dicarboxylic acids, or their low-molecular dialkyl esters, with diols having aliphatic alcohol groups, at 150°–250° C. in an inert atmosphere, for example a nitrogen atmosphere, in the presence of catalysts and while at the same time removing the water or alkanol formed, and subsequently carrying out the polycondensation reaction at 200° to 320° C. and under reduced pressure in the presence of specific catalysts until the polycondensation products have the desired viscosity. After it has been removed from the reaction vessel and cooled, the resulting polyester melt is granulated or broken into chips in a conventional manner.

Esterification catalysts which can be used are, in a known manner, amines and inorganic or organic acids, for example hydrochloric acid or p-toluenesulphonic acid, or, alternatively, metals or metal compounds which are suitable as transesterification catalysts.

Since some catalysts preferentially accelerate transesterification and others preferentially accelerate the polycondensation reaction, a combination of several catalysts is advantageously used. Examples of suitable transesterification catalysts are the oxides, salts or organic compounds of the metals calcium, magnesium, zinc, cadmium, manganese, titanium and cobalt. It is also possible to use the metals themselves as catalysts. The polycondensation reaction is catalysed, for example, by metals such as lead, titanium, germanium and, especially, antimony or tin, and the compounds thereof. These catalysts can be added together or separately to the reaction mixture. These catalysts are employed in amounts of about 0.001 to 1.0 percent by weight, relative to the acid component.

Those catalysts which accelerate both the transesterification and the polycondensation reaction are particularly advantageously used in the preparation of the polyesters according to the invention. Possible catalysts of this type are, in particular, mixtures of different metals or metal compounds and also corresponding metal alloys.

Another embodiment for the preparation of the novel polyesters consists in subjecting one or more dicarboxylic acid dihalides, preferably the acid dichlorides, to a polycondensation reaction with diols containing aliphatic alcohol groups, in the presence of a basic catalyst, in the temperature range from 0° to 100° C., with the elimination of hydrogen halide. The basic catalysts used are preferably amines or quaternary ammonium salts. The proportion of basic catalyst can be from 0.1 to 100 mol %, relative to the acid halides. This process can also be carried out without a solvent, or in the presence of a solvent.

The polycondensation reaction can also be carried out by first subjecting the starting compound to a condensation reaction in the melt until a certain viscosity is reached, then granulating the precondensate prepared in this way for example with the aid of an underwater granulator, and drying the granules and then subjecting them to a solid phase condensation reaction, for which vacuum and temperatures below the melting point of the granules are employed. Higher viscosities can be achieved by this means.

Inert additives of all types, such as fillers or reinforcing fillers, such as kaolin, metal powders, wollastonite, glass balls and, especially glass fibres, inorganic or organic pigments, optical brighteners, delustering agents, mould release agents, agents which promote crystallization and flameproofing agents, can be added to the reaction mass during working up of the polyester melt or even prior to the polycondensation reaction.

If the polycondensation reaction is carried out discontinuously, the inert additives can already be added during the final condensation steps, for example during the solid phase condensation reaction or at the end of the melt condensation.

The polyesters according to the invention are amorphous, depending on which diols and which dicarboxylic acids are used as the starting components and the ratios in which these are employed. The polyesters are colourless to yellow coloured and are thermoplastic materials (engineering plastics), from which mouldings having valuable properties can be produced by the conventional shaping processes, such as casting, injection moulding and extruding. Examples of such mouldings are components for technical equipment, apparatus casings, household equipment, sports equipment, electrical insulations, car components, circuits, sheets, films and semi-finished products which can be shaped by machining. It is also possible to use the polyesters for coating articles by known powder coating processes and for the production of fibres.

The polyesters according to the invention are surprisingly more stable to thermooxidative degradation and resistant to stress cracking. The absorption of water is also suprisingly lower. The mechanical properties are only slightly changed. The reduction in the notched impact strength on warm storage is also substantially less. The combustibility is surprisingly reduced.

The polyesters prepared according to the examples which follow are characterised in more detail by the following identifying data. The polyesters are characterised by those morphological changes which are measured by means of differential thermal analysis on a sample which has been heat-treated at 30° C. above the melting point or above the softening point for 3 minutes and then rapidly chilled. The chilled sample is heated at a heating rate of 16° C./minute by means of a "DSC-1B" differential scanning calorimeter from Messrs. Perkin-Elmer. The thermogram of the sample shows the glass transition temperature ($T_g$), the crystallisation temperature ($T_c$) and the crystallite melting point ($T_m$).

The glass transition temperature is given as the turning point at the sudden increase in the specific heat in the thermogram, the crystallisation temperature is given as the apex of the exothermic peak, the melting point is given as the apex of the endothermic peak and the decomposition temperature ($T_d$) is given as that point at which the sudden exothermic and endothermic variations in the specific heat start. The relative viscosity of the polycondensation products of the examples is determined on solutions of 1 g of polyester in 100 ml of a mixture consisting of equal parts of phenol and symmetrical tetrachloroethane, at 30° C. The softening temperature ($T_s$) is determined on a Kofler heated stage microscope at a heating rate of 15° C./minute, a cross being formed from 2 filaments and the softening point being designated as that temperature at which the sharp angles of the cross disappear.

The examples which follow serve to illustrate the invention further. In these examples, parts are parts by weight.

EXAMPLE 1

248 parts of N,N'-bis-(4-carbomethoxybenzoyl)-isophoronediamine (compound A) and 158 parts of 2,2-bis-[4'-($\beta$-hydroxy-ethoxy)-phenyl]-propane (D 22) and 0.146 part of isopropyl titanate are filled into a 2 liter reactor fitted with a stirrer, a nitrogen inlet, a condenser and a device for measuring the temperature. 97% of the amount of methanol theoretically to be expected is distilled off in the course of 2 hours and 15 minutes, whilst stirring and passing nitrogen through the mixture, and during this period the temperature of the reaction mixture rises to 240° C.

A vacuum of 50 mm Hg is then applied in the course of half an hour by means of a water pump and, at the same time, the reaction temperature is raised to 255° C. Using a vacuum pump, the vacuum is increased, at a constant reaction temperature, to 0.07 mm Hg in the course of 15 minutes. 15 minutes after this vacuum has been reached, the reaction is discontinued and the product is comminuted and subjected to a further condensation reaction (24 hours) in a thin layer at 210° C. and 0.1 mm Hg. This gives an amorphous polyester which has the following characteristics:

Relative viscosity—1.74 dl/g
Glass transition temperature ($T_g$)—150° C.
Softening point—195° C.

EXAMPLE 2

273 parts of 2-(diphenylamino)-4,6-bis-(p-carbethoxyanilino)-s-triazine (compound B) and 1 58 parts of 2,2-bis-[4'-(β-hydroxyethoxy)-phenyl]-propane (D 22) and 0.058 part of isopropyl titanate are filled into a 2 liter reactor fitted with a stirrer, a nitrogen inlet, a condenser and a device for measuring the temperature. 95% of the amount of methanol theoretically to be expected is distilled off in the course of 3 hours and 30 minutes, whilst stirring and passing nitrogen through the mixture, and during this period the temperature of the reaction mixture rises to 260° C. A vacuum of 40 mm Hg is applied in the course of half an hour by means of a water pump, whilst heating the reaction mixture to 270° C. The vacuum is increased to 0.20 mm Hg, at a constant reaction temperature, in the course of 30 minutes using a vacuum pump. 2½ hours after this vacuum has been reached, the reaction is discontinued and the product is comminuted and subjected to a further condensation reaction for 24 hours in a thin layer at 210° C. and 0.1 mm Hg. This gives an amorphous polyester which has the following characteristics:

Relative viscosity—1.80 dl/g
Glass transition temperature ($T_g$)—171° C.
Softening point ($T_s$)—210° C.

EXAMPLES 3-5

Various polyesters are prepared analogously to Example 1. Their characteristics and their composition are summarised in the table which follows:

Table 1

| Example No. | Composition | Molar ratio | $\eta_{rel}$ | $T_g$ (°C.) | $T_s$ (°C.) |
|---|---|---|---|---|---|
| 3 | Compound A + D22 | 1:0.5:0.5 | 1.51 | 170 | 200 |

Table 1-continued

| Example No. | Composition | Molar ratio | $\eta_{rel}$ | $T_g$ (°C.) | $T_s$ (°C.) |
|---|---|---|---|---|---|
|  | + compound C |  |  |  |  |
| 4 | Compound A + D33 | 1:1 | 1.45 | 151 | 200 |
| 5 | Compound E + D22 | 1:1 | 1.39 | 131 | 190 |

Compound E = N,N'-bis-(4-carbobutoxybenzoyl)-m-phenylenediamine
D 33 = 2,2-bis-[4'-(β-hydroxypropoxy)-phenyl]-propane
Compound C = 1,3-hydroxyethyl-4,5,6,7-tetrabromobenzimidazolone

EXAMPLE 6

(a) Test samples are prepared from a moulding composition prepared analogously to Example 1 and various properties, which are summarised in the table which follows, are measured on these samples.

(b) For comparison with the above, a polybutylene terephthalate copolyester with 40 mol % compound A is prepared, test samples are prepared therefrom and the same properties are measured.

Table 2

| Property | a | b (comparison) |
|---|---|---|
| Maximum bending stress (kp/cm$^2$) DIN 53,452 | 1,140 | 1,090 |
| Modulus of elasticity from the bending test DIN 53,452 (kp/cm$^2$) | 20,000 | 17,000 |
| Impact strength (cmkp/cm$^2$) DIN 53,453 | no break | no break |
| Warm storage (130° C., 50 days) Reduction in the notched impact strength, in % | 22 | 45 |
| Start of decomposition (thermogravimetry) |  |  |
| in N$_2$ (°C.) | 334 | 320 |
| in air (°C.) | 333 | 308 |
| Absorption of water in % (in H$_2$O, 50 days) | 2.5 | 2.5 |
| Stress cracking (= 2.5%, t = 1 minute) |  |  |
| in methanol | resistant | not resistant |
| in diesel oil | resistant | not resistant |
| Combustibility ASTM D 635 | 70 | 90 |
| Burning time (seconds) | 70 | 90 |

EXAMPLES 7-19

Various polyesters are prepared analogously to Example 1. Their characteristics and their composition are summarised in Table 3 which follows.

Table 3

| Batch No. | Composition | Molar ratio | $\eta_{rel}$ | $T_g$ (°C.) | $T_s$ (°C.) |
|---|---|---|---|---|---|
| 7 | B + C$_1$ | 0.5:0.5 | 1.47 | 180 | 200 |
| 8 | B + IPA + C$_1$ | 0.35:0.15:0.5 | 1.51 | 158 | 180 |
| 9 | B + TPA + D22 + CHDM | 0.35:0.15:0.25:0.25 | 1.39 | 167 | 185 |
| 10 | B + TPA + D22 + 1,6-hexanediol | 0.4:0.1:0.25:0.25 | 1.43 | 156 | 185 |
| 11 | B + TPA + D22 | 0.4:0.1:0.5 | 1.53 | 160 | 190 |
| 12 | B + TPA + IPA + D22 | 0.25:0.15:0.1:0.5 | 2.12 | 155 | 180 |
| 13 | D + B + D22 | 0.35:0.15:0.5 | 1.46 | 152 | 175 |
| 14 | B + F | 0.5:0.5 | 1.39 | 183 | 225 |
| 15 | I + D22 | 0.5:0.5 | 1.30 | 114 | 215 |
| 16 | K + D22 | 0.5:0.5 | 1.31 | 153 | 200 |
| 17 | L + D22 | 0.5:0.5 | 1.53 | 174 | 210 |
| 18 | M + D22 | 0.5:0.5 | 1.39 | 131 | 190 |
| 19 | N + D22 | 0.5:0.5 | 1.72 | 170 | 220 |

Table 3-continued

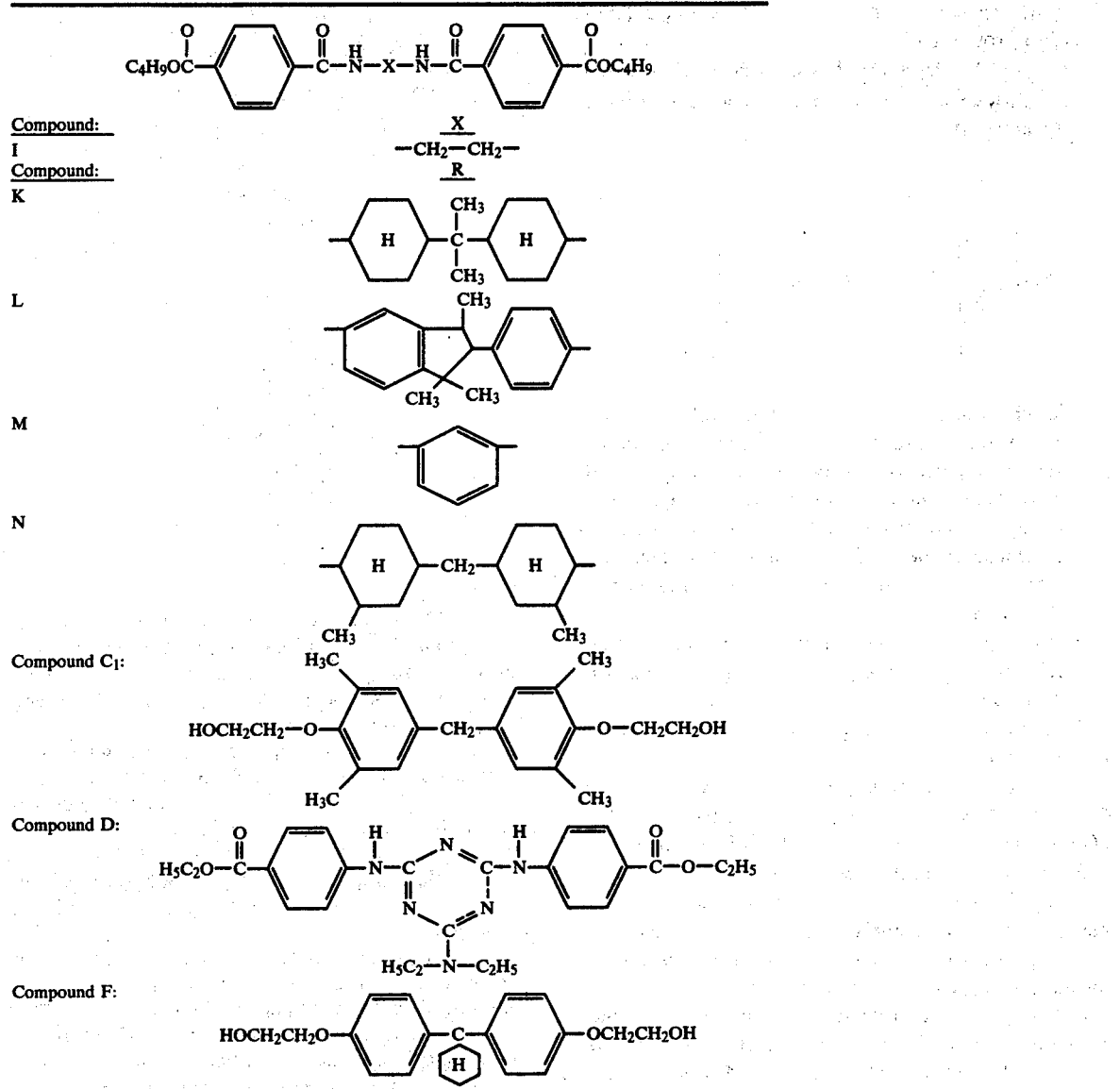

IPA = isophthalic acid
TPA = terephthalic acid
CHDM = 1,4-cyclohexanedimethanol
D22 = 2,2-bis-[4'-(β-hydroxyethoxy)-phenyl]-propane

What is claimed is:

1. A linear thermoplastic polyester which has a relative viscosity of at least 1.30, measured on a solution of 1 gram of polyester in 100 ml of a solvent consisting of equal parts of phenol and symmetrical tetrachloroethane at 30° C., which comprises the condensation product in about a 1:1 molar ratio of diacids (a) and (b) with diols (c) and (d) so that the composition of the polyester comprises (a) from 25 to 50 mol %, based on total polyester, of radicals of at least one dicarboxylic acid which contain NH groups and is of the formula I HOOC—A—(CO)$_n$—NH—X—NH—(CO)$_n$—A—COOH  (I)

in which A represents o-phenylene, m-phenylene, p-phenylene, 1,4-naphthylene or 1,6-naphthylene, n is 0 or 1, and X, when n is 0, represents a radical of formula II

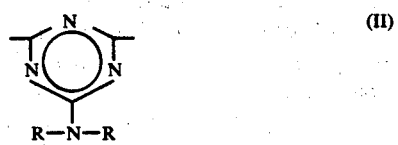

in which R is methyl, ethyl, cyclohexyl or phenyl, or x, when n is 1, represents a divalent hydrocarbon radical of aliphatic or aromatic character;

(b) from 25 to 0 mol %, based on the total polyester, of radicals of terephthalic acid, isophthalic acid or a mixture thereof; and in the diol component of the polyester (c) from 0 to 25 mol %, based on the total polyester, of radicals of one or more diols containing aliphatic diol groups; and (d) from 50 to 25 mol %, based on the total polyester, of radicals of at least one bisphenol derivative of formula III

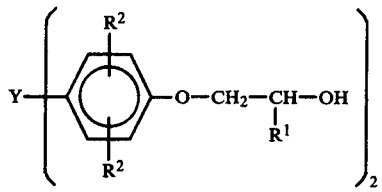
(III)

in which R¹ represents hydrogen, methyl or ethyl, R² represents hydrogen, chloro, bromo or methyl, and Y represents methylene, ethylene, phenylmethylene, diphenylmethylene, methylphenylmethylene, alkylidene of 2 to 4 carbon atoms, 1,1-dichloroethylidene, 1,1,1-trichloroethylidene, cycloalkylidene of 5 to 8 carbon atoms, a direct bond, O, S or SO₂, wherein the radicals (a) and (b) are attached to radicals (c) and (d) through ester linkages in a random distribution.

2. A polyester according to claim 1, which has a relative viscosity of 1.5–3.5.

3. A polyester according to claim 1 containing from 40 to 50 mol % of component (a), from 10 to 0 mol % of component (b), from 10 to 0 mol % of component (c), and from 40 to 50 mol % of component (d).

4. A polyester according to claim 1, wherein, in formula I, A represents m-phenylene or p-phenylene.

5. A polyester according to claim 1, wherein R, in formula II, represents ethyl or phenyl.

6. A polyester according to claim 3 containing 50 mol % of component (a), and 50 mol % of component (d).

7. A polyester according to claim 4 wherein A is p-phenylene.

8. A polyester according to claim 1 wherein x, as a divalent hydrocarbon radical, represents alkylene of 1 to 12 carbon atoms; or cycloalkylene, alkylcycloalkylene, alkylenecycloalkylene, alkylenecycloalkylenealkylene, alkylenealkylcycloalkylene, arylene, alkylarylene, alkylenearylene or alkylenearylenealkylene, which contains a total of 5 to 15 carbon atoms.

9. A polyester according to claim 1, wherein the diol is a linear or branched alkylenediol having 2 to 12 carbon atoms.

10. A polyester according to claim 1, wherein the diol containing aliphatic diol groups is of the general formula IV

HOCHCH₂—Z—CH₂CHOH (IV)
|         |
R³        R³ in which R³ represents methyl or a hydrogen atom and Z represents a radical of the formulae Va–Vc

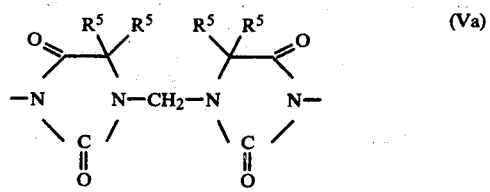
(Va)

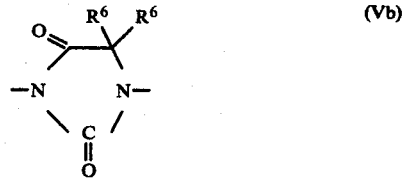
(Vb)

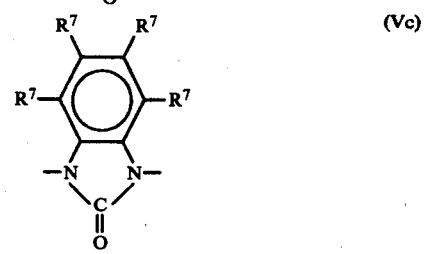
(Vc)

in which R⁴, R⁵ and R⁶ independently of one another represent alkyl having 1 to 4 C atoms or together represent tetramethylene or pentamethylene, and the R⁷ independently of one another represent a hydrogen, chlorine or bromine atom.

11. A polyester according to claim 10, wherein R³ represents a hydrogen atom, R⁴, R⁵ and R⁶ represent methyl and all of the R⁷ represent either a hydrogen atom, a chlorine atom or a bromine atom.

12. A polyester accordng to claim 1, wherein, in formula III, R¹ represents methyl or a hydrogen atom and R² is bonded in the two ortho-positions relative to the oxygen atom.

13. A polyester according to claim 1 wherein, in formula III, R² represents a hydrogen atom.

14. A polyester according to claim 1, wherein Y is ethylidene, 1,1- or 1,2-propylidene, 1,1-dichloro- or 1,1,1-trichloro-ethylidene, butylidene, cyclohexylidene, methylene, ethylene, phenylmethylene, diphenylmethylene or methylphenylmethylene.

15. A polyester according to claim 1, wherein the diol of the formula III is 2,2-bis-[4'-(β-hydroxyethoxy)-phenyl]-propane.

16. A polyester according to claim 8 wherein cycloalkylene contains 5 to 7 carbon atoms in the ring, arylene represents phenylene, and alkylene in alkylenecycloalkylene, alkylenecycloalkylenealkylene, alkylenealkylcycloalkylene, alkylenearylene or alkylenearylenealkylene contains 1 to 4 carbon atoms.

17. A polyester according to claim 16, wherein X, in formula I, represents phenylene, cyclohexylene or a radical of the formulae

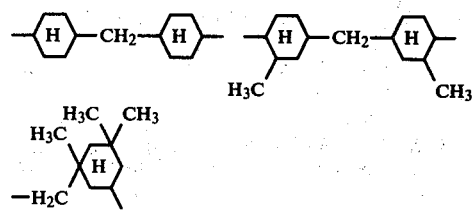

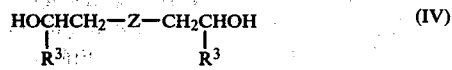

-continued

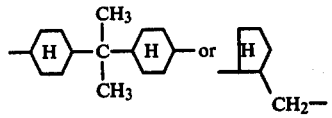

18. A polyester according to claim 16 wherein alkylene contains 1 to 2 carbon atoms.

19. A polyester according to claim 9 wherein the alkylenediol contains 2 to 6 carbon atoms.

20. A polyester according to claim 19 wherein the alkylenediol is ethylene glycol or tetramethylene glycol.

21. A polyester according to claim 10 wherein $R^3$ is hydrogen.

22. A polyester according to claim 12 wherein $R^1$ is hydrogen.

* * * * *